May 29, 1962

J. FARMER 3,036,920

FRUIT TREATING PROCESS

Filed Oct. 18, 1960

Inventor:
John Farmer
By Wilmer Mechlin
his Attorney

Inventor:
John Farmer

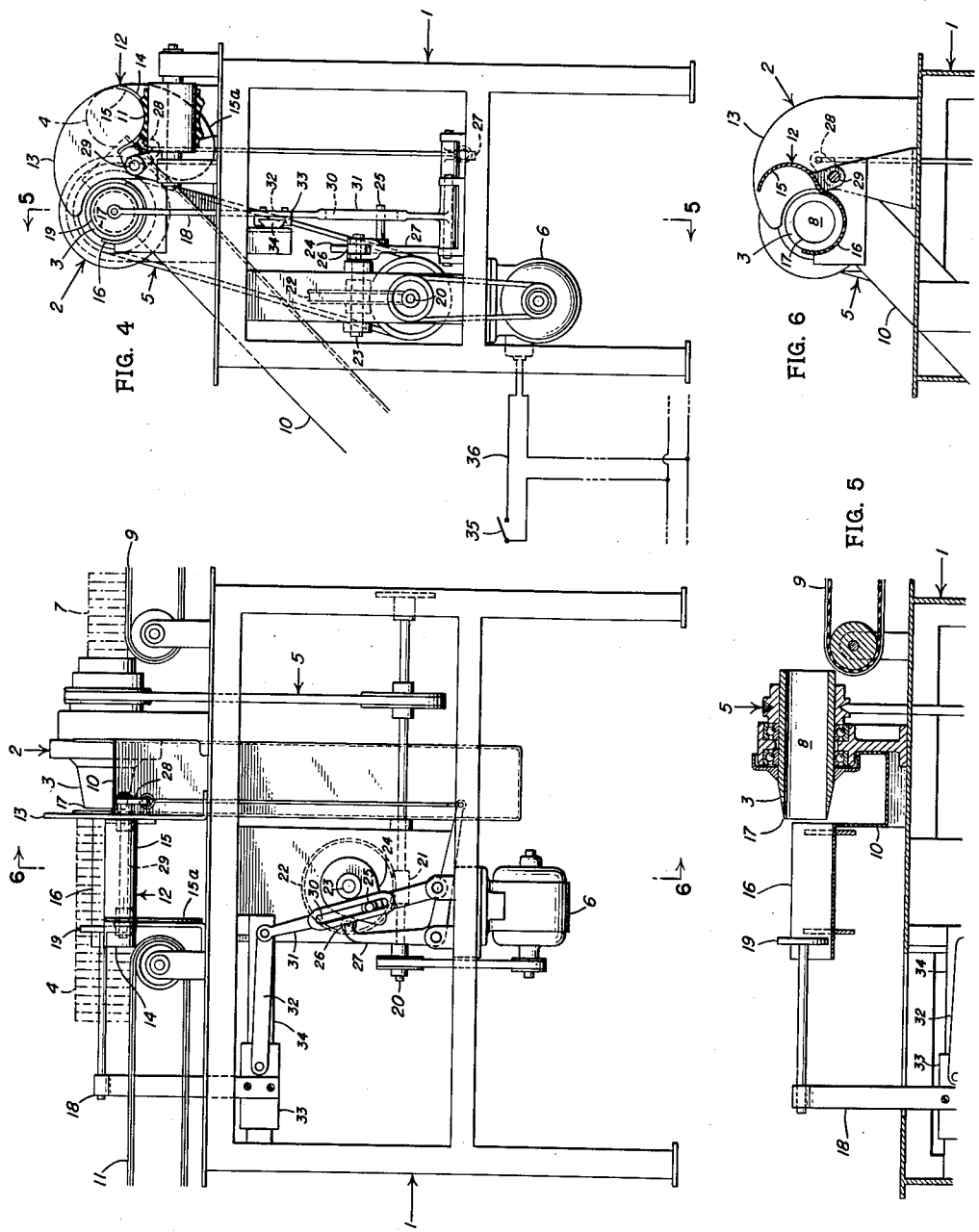

United States Patent Office 3,036,920
Patented May 29, 1962

3,036,920
FRUIT TREATING PROCESS
John Farmer, Kailua, Oahu, Hawaii, assignor to Honolulu Iron Works Company, Honolulu, Hawaii, a corporation of Hawaii
Filed Oct. 18, 1960, Ser. No. 63,451
8 Claims. (Cl. 99—103)

This invention relates to a process for treating pineapples and like fruit which is sized and sliced before canning or other packaging.

The primary object of the invention is to provide an improved process for treating pineapples and like fruit whereby the volume of fruit available to the "solid pack" is greatly increased, while both the labor and equipment required for treating the fruit are drastically reduced.

Another object of the invention is to provide a process for treating pineapples and like fruit wherein, instead of being sized but once, the fruit after an initial sizing is in part resized with the diameters of the plurality of sizings so related as to extract as cylinders available for the solid pack the bulk of the edible portion of the fruit.

An additional object of the invention is to provide a process for treating pineapples and like fruit wherein the fruit is initially sized before and partially resized after slicing to facilitate sorting and inspection and make the bulk of the edible portion of the fruit available to the solid pack.

A further object of the invention is to provide an improved process for treating pineapples and the like whereby not only is the bulk of the edible portion of the fruit made available to the solid pack but the need for end eradicating incident to initial sizing is eliminated.

A further object of the invention is to provide a process for treating pineapples and like fruit which eliminates entirely the need for a trimming operation and thereby both drastically reduces the labor and equipment required for treating the fruit and effectively eliminates the large fruit loss due to damage and waste necessarily attendant manual trimming.

Other objects and advantages of the invention will appear hereinafter in the detailed discussion, be particularly pointed out in the appended claims and be illustrated in the accompanying drawings, in which:

FIGURE 3 is a side elevational view of the machine of FIGURE 3;

FIGURE 4 is an end elevational view of the machine of FIGURE 3;

FIGURE 5 is a fragmentary vertical sectional view taken along the lines 5—5 of FIGURE 3; and FIGURE 6 is a fragmentary vertical sectional view taken along the lines 6—6 of FIGURE 3.

While it has been the practice almost since the inception of the pineapple canning industry to recover the edible fruit or meat by sizing the pineapple to cut out a cylinder of fruit, there is a basic dissimilarity between the normal, ovoidal or egg-shape of a pineapple and the straight fruit cylinder. If, as in the conventional process, a pineapple is sized at the outset and but once, this basic dissimilarity necessitates a compromise in the size of the fruit cylinder cut from the pineapple between maximum length and maximum diameter, with the result, graphically illustrated in the lower half of FIGURE 1, that a very considerable portion of the edible fruit about the waist of the pineapple is cut off with the waist portion or shell of the skin and, regardless of its quality, thereafter is available at best for use in the crushed pack. If, in accordance with another tenet of the conventional process, substantially all remaining traces of the skin must be removed at the outset with the butt and crown or end cuts, a further diminution of possible fruit available to the solid pack is inevitable due to the irregular shape of the ends.

It has now been discovered that if, instead of the conventional single sizing to one diameter, the middle and end portions of the pineapple are sized to different diameters, the volume of the fruit available to the premium-priced solid pack is greatly increased and if, in addition, the end cuts are so limited in depth as to remove negligible amounts of edible fruit with the butt and crown without regard to skin traces, a further increase in the solid pack recovery is obtained.

Figure 1:
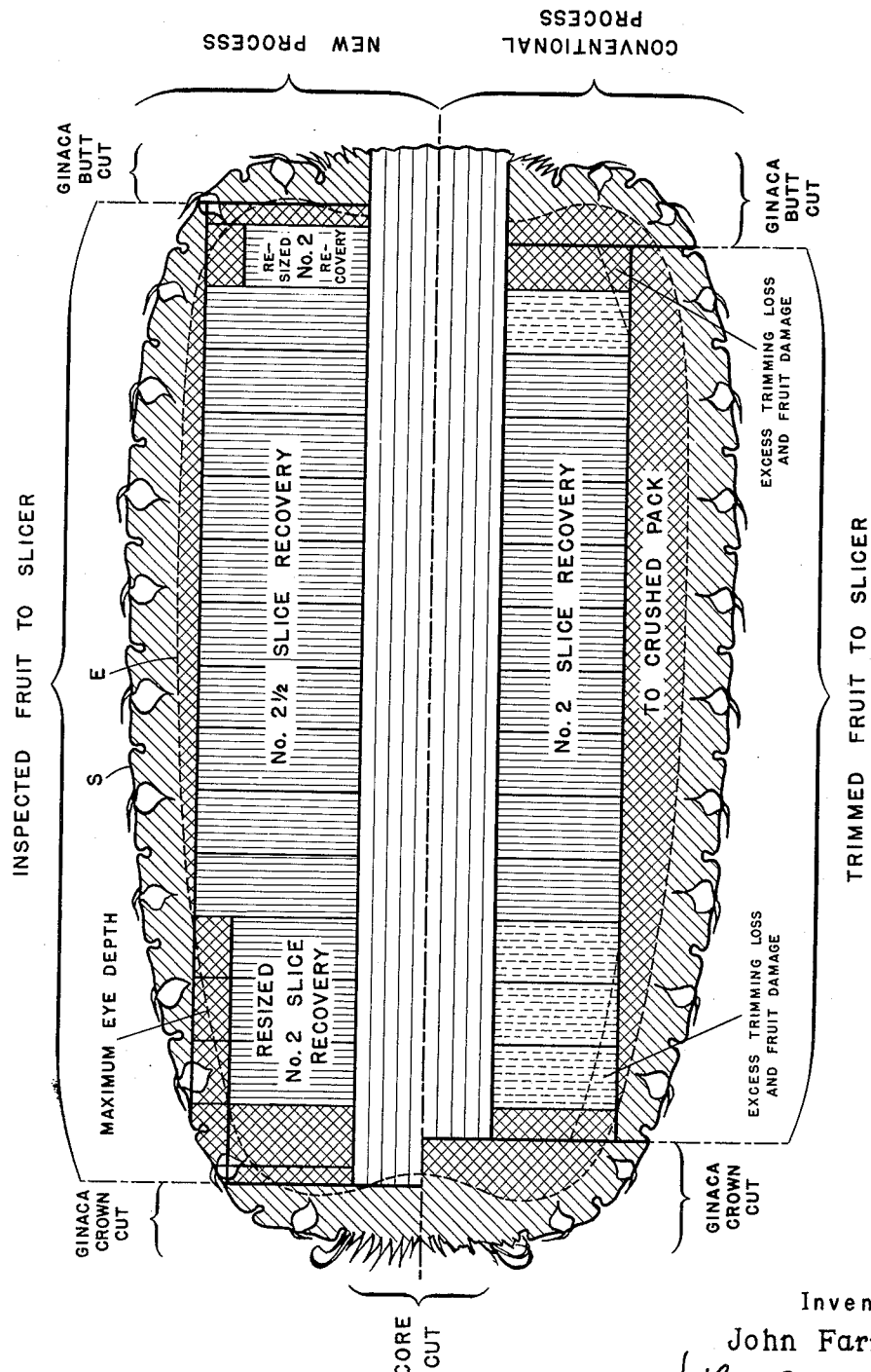
FIGURE 1 is a diagrammatic longitudinal section of a pineapple comparing the solid pack fruit recovery of the process of this invention with that of the conventional process.

The extent of the increase in the solid pack recovery obtainable by a process involving such plural sizing and limited depth end cutting, over the conventional process, is graphically illustrated in the comparative analysis of FIGURE 1 of a longitudinal section of a typical pineapple. If, as illustrated, its maximum diameter and length are about 5 in. and 8¾ in., respectively, the fruit in the conventional process would be graded, as indicated in the lower half of FIGURE 1, for sizing to a fruit cylinder of 3⅛ in. in diameter to produce #2 slices of the usual ½ in. thickness and the depth of the crown and butt end cuts would be about ⅞ in. and ⅝ in., respectively. Discarding the two end slices of the fruit cylinder remaining after sizing and end cutting as too thin for the solid pack, there would remain from the original volume of the pineapple of around 134 cu. in. a cored cylinder having a volume of fruit available to the solid pack of some 43.2 cu. in. However, this available volume is only theoretical, since, as indicated in the figure, between two and four of the end slices can be expected to be lost to the solid pack by excess waste and damage during the trimming operation immediately following the sizing, coring and end cutting, thus reducing the theoretical to an actual solid pack recovery of some 30.1 cu. in. This is substantially the actual result obtained in the pineapple canning industry in which, out of all of the edible fruit extracted from the skin of an average ton of pineapples, about 620 lbs. are crushed and only 600 lbs. go to the solid pack, a ratio disproportionate to that derivable if only the edible fruit removed with the skin S of the illustrated pineapple were relegated to the crushed pack.

By contrast, if, as indicated in the upper half of FIGURE 1, the pineapple is graded instead for initial sizing to a diameter of 3¾ in., substantially the maximum diameter of the fruit within the maximum anticipated eye depth indicated at E to provide #2 slices of the usual ½ in. thickness, the crown and butt end cuts are limited in depth to about ½ in. and ⅜ in., respectively, and the end portions are resized without intervening trimming to a diameter of 3⅛ in. to produce #2 slices, there is obtained from the same 134 cu. in. pineapple a theoretical volume of fruit available to the solid pack of some 63.3 cu. in. Even though the waist portion of the first sizing is wider than the corresponding portion of the sizing of the conventional process, it, as well as the resized end portions, are contained within the maximum anticipated eye depth line E. If, then, the cored fruit cylinder were sliced after discarding any wholly rotten or otherwise useless fruit but without intervening trimming and any waist slices containing extra deep eyes or peripheral rotten portions were resized to the size of the end portions, all trimming losses would be eliminated and the actual recovery would approach the theoretical. Accordingly, a process involving plural sizing and limited depth end cutting has, over the conventional process, a theoretical advantage of about 46% and, if the resizing is conducted selectively after slicing and without any trimming, a much greater actual advantage.

Based on the above discovery, the improved process of the present invention is in essence that described in the foregoing discussion of the upper half of FIGURE 1 in which a pineapple is initially sized to substantially maximum diameter and, preferably after sorting to remove any wholly rotten or otherwise useless fruit and subsequent slicing but without trimming, is in part resized to recover the maximum possible fruit for the solid pack. Not only does this process possess a tremendous advantage over the conventional process in both the theoretical and the actual recoveries of fruit available to the solid pack but, since the amount of edible fruit adhering to the severed butt and crown is negligible, no purpose is served by the end eradication customarily and cumbersomely conducted incident to sizing in the conventional process and the ends as cut off can be sent directly to the mill for recovery of valuable by-products.

Further, the improved process, by eliminating the trimming operation essential to the conventional process in which eyes and other inedible portions are cut by hand from the sized fruit cylinders before slicing, eliminates with it almost half of the labor and equipment required in the conventional process and a large portion of the loss in processing through damage and waste due to the handling and the practical impossibility of restricting the trimming exactly to the imperfections.

Figure 2:
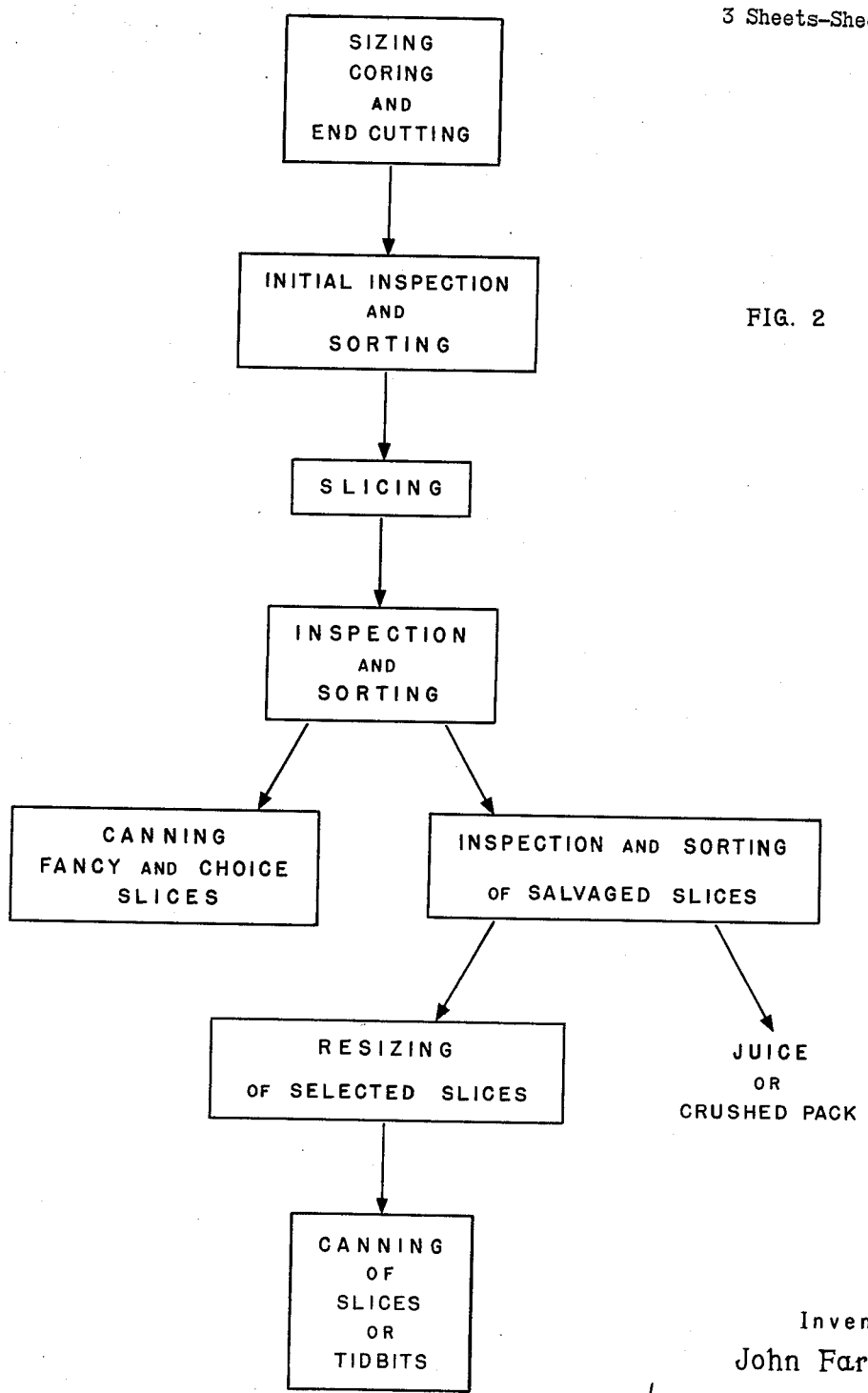
FIGURE 2 is a flow sheet of the process of the present invention.

While some benefit might be derived from sizing the middle portion of a pineapple to one diameter and the end portions to another at the outset, it is more practical to realize the potential of plural sizing by the preferred form of the process illustrated by the flow sheet of FIGURE 2 in which at the outset a pineapple is sized once, cored and end cut, with the diameter of the sizing gauged to provide a fruit cylinder of substantially maximum diameter over the waist portion of the pineapple within the limitations imposed by the maximum anticipated depth E of the eyes in the skin or shell S over that portion and the butt and crown cuts limited in depth to remove a negligible amount of edible fruit. In the next stage of the conventional process, the fruit cylinder would be trimmed. However, in this process the cylinders from the sizing, coring and end cutting step are simply inspected and sorted to remove any wholly rotten or otherwise inedible fruit. The remaining cylinders are passed from this initial inspection and sorting to a slicer in which, as in the conventional process, the cylinders are cut or sliced radially into slices of ½ in. or other desired uniform thickness. Following the slicing, the slices are inspected and sorted to separate those having no adhering skin traces and otherwise of suitable quality for canning as the fancy and choice slices of the solid pack. The remaining or salvage slices from this second inspection and sorting are then salvaged at a salvage table or other suitable work area. Here, any end slices of insufficient thickness and either end or intermediate slices having inedible portions toward their centers are separated as appropriate for the juice or crushed pack.

There remain the slices, mostly from the end portions of the pineapple, which, due to traces of skin or other imperfections on or in their peripheral portions, were not suitable for canning as fancy or choice slices of the diameter of the initial sizing, but within their peripheries contain fruit of a quality suitable for canning in the form of smaller slices or tidbits as part of the solid pack. Instead of being relegated as in the conventional process to the juice or crushed pack, along with the other salvage slices, these slices, in accordance with this process, are resized to a smaller size or sizes suitable for the solid pack and only their peripheral portions cut therefrom are relegated to the juice or crushed pack. It is this second sizing or resizing, conducted on the salvage slices selected as suitable therefore, usually to one, but if desired to a plurality of diameters smaller than that of the initial sizing, that with the initial sizing is mainly responsible for the tremendous increase over the conventional process in the volume of fruit available to the solid pack.

While the increase in the recovery of solid pack fruit and reduction in the labor and equipment required for the processing are the main advantages of the plural sizing process of this invention, there are others. One of the foremost of these is an advantage, in addition to the elimination of end eradication, in limiting the thickness of the butt and crown cuts so as to remove with the cuts a negligible amount of edible fruit. As a result of this limitation, the ends of the cylinders will generally have adhering to them a layer of skin which will be cut off in slicing but during the initial inspection and sorting serves to protect the cylinder ends from damage by handling. Of even more importance, since the salvage slices selected for resizing all have previously been cored, their resizing, although performable on a Ginaca machine, requires no such complicated and expensive machinery but simply a machine capable of cutting from each a cylinder of smaller size suitable for the solid pack, such as that illustrated in FIGURES 3–6.

Mountable conveniently on a salvage table or suitable separate stand 1 in the salvage area, the illustrated resizing machine 2 is comprised of a rotary cylindrical or tubular knife 3 similar to the conventional Ginaca knife but of a size or inside diameter to cut out slices of the desired size from the selected salvage slices indicated at 4. Rotatably driven or rotated through a belt and pulley or other suitable drive 5 by a motor 6 conveniently mounted inside the table or stand 1, the rotary resizing knife 3 may discharge the resized slices, indicated at 7, from its cylindrical throat or axial bore 8 directly onto a preferably formed rubber belt or like endless discharge conveyor 9 to facilitate their delivery to the can loading machinery (not shown) either directly or through an intervening inspection station for sorting according to quality. At the same time, the peripheral portions cut off from the salvage slices are discharged from the knife into a discharge chute 10 for use in the juice or crushed pack. The illustrated machine also uses a preferably formed rubber belt or like endless feed conveyor 11 on which the operator or operators at the salvage table or station may place or stack the selected salvage slices 4 on edge for feeding or delivery to the resizing knife 3.

While the salvage slices might be fed directly to the resizing knife 3 and the resizing conducted as a continuous operation, it ordinarily will be preferred to conduct the resizing as a batch operation, due to the difficulty of ensuring a continuous supply, particularly if the salvage slices are selected non-automatically. To this end, the feed belt 11 preferably runs parallel to but to one side of rather than in alignment with the resizing knife 3 and feeds the selected salvage slices 4 onto an aligned supply or receiving trough 12 over which each slide is pushed by the face of the belt on succeeding slices until the end slice abuts against a stop plate 13 at the inner end of the trough. The supply trough 12 is made of two sections, one a fixed entry section 14 adjacent the feed belt 11 and the other a transfer, delivery section, cradle or slide 15 hingedly or swingably mounted on the table or stand 1 and adapted to swing normal to the axis of the resizing knife 3 and dump, deposit, transfer or slide a batch of the selected slices onto a guide or receiver trough 16 concentric with and in advance of the leading or cutting edge 17 of the knife and of the same diameter as the selected slices, the batch during the transfer being contained and guided at its inner end by the stop plate 13 and at its outer end by a guide plate 15a, integral with the hinged section and sweeping during the transfer between that section and the fixed entry section 15. Once deposited on the guide trough 16, the batch of selected slices are fed to and through the resizing knife 3 by a pusher 18 reciprocally mounted on the table or stand 1 and having a head or pusher plate 19 engageable with the outer or confronting end of the batch.

The desired batch or intermittent resizing of the selected slices does not require interruption of the running of the feed and discharge belts 9 and 11. On the contrary, it is desired that the belts run continuously, the feed belt to move the selected slices out of the way of the operator after he has placed several slices thereon end to end so that each will assist the others in standing on edge on the belt, and the discharge belt to eliminate resistance to the force of the pusher 18 in forcing the resized slices through the throat 8 of the resizing knife 3. It thus is only the pusher 18 and the transfer section 15 of the supply trough 12 that need operate intermittently to enable the desired batch operation to be performed. However, in the illustrated resizing machine, the resizing knife 3 also is operated intermittently so that the pusher 18 and transfer section 15 may be driven by the motor 6 driving the knife.

For drivably connecting the pusher 18 and transfer section 15 to the motor 6, the drive 5 for the resizing knife 3 includes a shaft 20 drivably connected to the motor and mounting a worm 21 forming with a worm wheel 22 a worm gear drivably connecting the shaft to a second shaft 23 on which are mounted a cam 24 and a crank pin 25. Of these latter elements, the cam 24 is engaged by a roller 26 at one end of a bell crank 27 pivoted to the frame, the other end of which is connected to a lever arm or crank 28 fixed to the transfer section 15 for swinging the latter about its hinge pin 29. The crank pin 25 in turn rides in a slot 30 in a lever 31 pivoted at one end to the frame and connected at its other end by a link 32 to a carriage 33 mounting the pusher 18 and itself mounted on a slide 34 fixed to the table or stand 1.

With the above arrangement and the cam 24 and crank pin 25 rotating clockwise, as viewed in FIGURE 3, operation of the motor 6 will rotate the resizing knife 3 and in sequence cause the transfer section 15 to swing upwardly from its normal position in line with the entry section 14 to a position at which the batch of selected slices carried by it will slide, drop or be dumped by gravity onto the guide trough 16. The transfer section 15 having been returned to its normal position by further movement of the cam 24, the crank pin 25 then comes into play through the lever 31, link 32 and carriage 33 to advance the pusher 18 and cause it to push the presented batch of selected slices on the guide trough 16 through the resizing knife 3 and ultimately onto the discharge belt 9. The cycle of operations is completed by further rotation of the crank pin 25 which reverses the direction of movement of the pusher 18 and restores it to normal position. This operating cycle, during which the resizing knife 3 rotates and in sequence the transfer section 15 oscillates and the pusher 18 reciprocates from and to normal position, may be effected automatically by the use of suitable sensing and switch-actuating means or, as in the illustrated embodiment, manually by a hand or foot operated switch 35 in the motor circuit 36.

In carrying out the process, the initial sizing, coring and end cutting may be performed by a conventional Ginaca machine, although for high speed operation it is preferred to use the improved machine disclosed in my copending application No. 29,508, filed on May 16, 1960, with the difference over the conventional process that the machine in either case will normally have an attachment for shell eradication but needs none for end eradication. On discharge from the Ginaca machine, the fruit cylinders will be conveyed or otherwise transported to the initial inspection and sorting station at which, in addition to removing and rejecting to the mill for by-product recovery any fruit which is rotten or otherwise useless, fruit suitable for the chunk or spear pack may be selected and removed as desired for such packing. The remaining fruit may be sliced by a conventional slicing machine or, and preferably, to minimize fruit damage, by a single cut slicer such as disclosed in my copending application No. 857,035, filed December 3, 1959. Following the subsequent inspection and sorting at a suitable inspection station at which, as indicated in the flow sheet of FIGURE 2, fancy and choice slices are separated and sent along for further sorting and canning, the salvage slices are transferred to a salvage table or other suitable salvage station for selection from the salvage slices of those suitable for resizing for the solid pack. The selected slices then are resized by a suitable machine, such as the resizing machine 2 illustrated in FIGURES 3-6. Finally, the resized slices, after sorting as necessary for quality, are delivered to suitable canning machinery for canning in slice or tidbit form as part of the solid pack.

As indicated earlier, the greatest benefit from the plural sizing process of this invention will be obtained when the initial sizing is to substantially the maximum diameter permitted by the depth of the eyes in the waist portion of the pineapple and the resizing will then be performed primarily on the end portions of the fruit. However, the plural sizing still is of advantage even if the initial sizing is to the diameter to which the fruit cylinder would be cut in the conventional process, the resizing then being applied to slices having eyes or other imperfections only in their peripheral portions and enabling recovery in the form of smaller diameter slices or tidbits of fruit which otherwise would be lost to the solid pack.

From the above detailed description, it will be apparent that there has been provided an improved process for treating pineapples and like fruit which, by subjecting a pineapple to a plurality of sizings, preferably with intervening slicing, effects a tremendous increase in the recovery of fruit available to the solid pack and a drastic reduction in the labor and equipment required for the treatment. It should be understood that the described and disclosed embodiment is merely exemplary of the invention and that all modifications are intended to be included which do not depart from the spirit of the invention or the scope of the appended claims.

Having described my invention, I claim:

1. A process for treating pineapples, comprising sizing a pineapple, slicing the sized pineapple into slices, and resizing selected of said slices.

2. A process for treating pineapples, comprising sizing, coring and end cutting a pineapple into a cored fruit cylinder, slicing the fruit cylinder into slices, and resizing selected of said slices.

3. In a process for treating pineapples in which a pineapple is sized, the step comprising resizing part of the sized pineapple.

4. In a process for treating pineapples, the steps comprising subjecting a pineapple to a plurality of sizings of different diameters.

5. In a process for treating pineapples, the steps comprising sizing a pineapple, and resizing part of the sized pineapple.

6. A process for treating pineapples, comprising sizing, coring and end cutting pineapples into cored fruit cylinders, discarding any rotten and otherwise useless cylinders, slicing the remaining cylinders into slices, separating slices having no imperfections for canning as fancy and choice slices, inspecting the remaining slices and sorting therefrom slices having imperfections only in their peripheral portions, and resizing said sorted slices to produce slices of smaller size suitable for canning as such and as tidbits.

7. In a process for treating pineapples, the steps comprising sizing a pineapple to a substantially maximum diameter within the maximum anticipated depth of eyes in a waist portion thereof, and resizing end portions of said pineapple to remove therefrom any skin traces and other imperfections.

8. A process for treating pineapples, comprising sizing pineapples to a substantially maximum diameter within the maximum anticipated depth of eyes in waist portions thereof, coring and end cutting said sized pineapples into cored and end cut fruit cylinders, inspecting said cylinders and sorting out and discarding any rotten and otherwise useless cylinders, slicing the remaining cylinders into slices, inspecting and sorting said slices to remove therefrom salvage slices unsuitable for canning as fancy and choice slices, selecting from said salvage slices slices having imperfections only in their peripheral portions, and resizing said selected slices to produce slices of a smaller size suitable for canning as such and as tidbits.

References Cited in the file of this patent

Cruess: "Commercial Fruit and Vegetable Products," published by McGraw-Hill, 1948, 3rd Edition, pages 183 to 184 and 175 to 179.